United States Patent
Abramov

(10) Patent No.: US 7,313,287 B2
(45) Date of Patent: Dec. 25, 2007

(54) METHOD FOR DIGITAL QUANTIZATION

(75) Inventor: Yuri Abramov, Har Hatzofim 24/4, Holon (IL) 58492

(73) Assignee: Yuri Abramov, Holon (IL)

( * ) Notice: Subject to any disclaimer, the term of this patent is extended or adjusted under 35 U.S.C. 154(b) by 712 days.

(21) Appl. No.: 10/478,233

(22) PCT Filed: May 21, 2002

(86) PCT No.: PCT/IL02/00396

§ 371 (c)(1),
(2), (4) Date: Nov. 20, 2003

(87) PCT Pub. No.: WO02/096007

PCT Pub. Date: Nov. 28, 2002

(65) Prior Publication Data

US 2004/0179595 A1    Sep. 16, 2004

(51) Int. Cl.
*G06K 9/36* (2006.01)

(52) U.S. Cl. ...................................... 382/251

(58) Field of Classification Search ............... 382/232, 382/236, 238–240, 248, 250, 251–252; 348/395.1, 348/398.1, 400.1–404.1, 407.1–418.1, 420.1–422.1, 348/430.1–431.1; 375/240.02–240.03, 240.11–240.24
See application file for complete search history.

(56) References Cited

U.S. PATENT DOCUMENTS

| | | | | |
|---|---|---|---|---|
| 5,764,805 A | * | 6/1998 | Martucci et al. | 382/238 |
| 5,870,499 A | * | 2/1999 | Bender et al. | 382/232 |
| 6,148,283 A | * | 11/2000 | Das | 704/222 |
| 6,516,297 B1 | * | 2/2003 | Servetto et al. | 704/222 |
| 6,594,627 B1 | * | 7/2003 | Goyal et al. | 704/222 |
| 6,728,413 B2 | * | 4/2004 | Onno | 382/253 |
| 6,748,116 B1 | * | 6/2004 | Yue | 382/238 |
| 7,106,228 B2 | * | 9/2006 | Bessette et al. | 341/106 |

OTHER PUBLICATIONS

J.A. Kelner, V.K. Goyal & J. Kovacevic, "Multiple Description Lattice Vector Quantization: Variations and Extensions", Data Compression Conf. Mar. 2000, pp. 480-489.

S.D. Servetto, "Lattice Quantization with Side Information", Data Compression Conf. Mar. 2000, pp. 510-519.

T. Seemann, P. Tischer, "Generalized Locally Adaptive DPCM", Proc. of IEEE Data Compression Conf., p. 473, 1997.

* cited by examiner

*Primary Examiner*—Jose L. Couso
(74) *Attorney, Agent, or Firm*—Edward Langer; Shiboleth, Yisraeli, Roberts, Zisman & Co.

(57) ABSTRACT

There is disclosed the use of a beehive cell arrangement of shaped quantization blocks for grouping pixels for the digital approximation of analog video information. A frame may consist of beehive-arranged hexagonal quantization cell blocks or brick-wall-arranged rectangular cell quantization blocks, where each pixel belongs only to one shaped quantization block. A beehive cell arrangement of circle-shaped quantization blocks is described for use when the frame is partitioned into overlapping quantization blocks.

16 Claims, 4 Drawing Sheets

METHOD FOR DIGITAL QUANTIZATION

FIELD OF INVENTION

The invention relates generally to the processing of video compression, and more particularly to problems related to quantization of video information.

BACKGROUND OF THE INVENTION

Digital video encoding algorithms, for example MPEG-X series, utilize a process for digital quantization of video information. The quantization process involves approximation of analog video information, for example an analog picture image, by a frame consisting of numerous pixels having the brightness and color attributes. Further MPEG-X series algorithms use such a compression technique that assumes a certain loss of video information. This means that after encoding-decoding procedure the pixels of the digitized video information differ from the original corresponding pixels with color and brightness. On the one hand, such a technique allows a substantial compression of the video information, and the quality of the image may be perceived to be more brimful than real, but on the other hand, several sequential repeats of the encoding-decoding procedure cause a substantial degradation of the video information. The MPEG-X series algorithm technique is based on the grouping of the pixels into "quantization blocks", such that all the pixels belonging to a particular block are coded separately, i.e. have the same brightness and color quantization rule leading to a certain degradation of video information. Usually the quantization rule is defined by quantization step chosen for each quantization block separately. Such an approximation of the video information allows reducing a bit stream of information by decreasing the video information resolution. These blocks may be grouped into macro-blocks to use a transferring vector for the approximation of the video information of the next frame, thereby further reducing the required bandwidth of the bit stream of information. In the case of movies, a tolerance of video information loss related to pixels aggregated into blocks may differ from one block to another and from a frame to the next one. This degree of freedom permits tracking of the picture elements from one frame to the next thereby further reducing the required bandwidth for the stream of bit information, in principal.

Thus known video compression procedures attempt to achieve increased resolution and decreased bandwidth requirements for transmitting video information by using different kinds of quantization rule for each block. Prior art blocks, which are used in MPEG-X algorithms, have form of rectangles arranged as it is shown in FIG. 1. In this case each rectangular block has eight neighbors: North, North-West, West, South-West, South, South-East, East and North-East. A degradation of the video information within each block is controlled by the quantization rule, however the degradation of video information on boundaries of the considered block with neighbor blocks is unpredictable in a certain meaning. If blocks and macro-blocks, defined for a frame, are transferred by a transferring vector in order to approximate the video information of the next frame, a statistical error in the imagination of the next frame is defined by the block neighbors, having independent attributes of color and brightness quantization rule, wherein, as it is described, for example, by Torsten Seemann and Peter Tischer and Tetra Lindarto in the paper titled "*Generalised Locally Adaptive DPCM*"—Proc. of IEEE Data Compression Conf., pp473, 1997, the error arises on the block boundaries.

U.S. Pat. No. 5,764,805 to Martucci, et al. discloses the use of overlapping polygonal shaped blocks for reducing statistical errors appearing at the quantization block boundaries.

SUMMARY OF THE INVENTION

Accordingly, it is a principal object of the present invention to overcome the limitations of existing video compression algorithms, and to provide improved algorithms for video compression by the definition of quantization blocks having a shape and arrangement similar to that of beehive cells.

The beehive cell shape and arrangement of the quantization block is optimal in accordance with the following optimization criteria.

The first mathematical criterion is to achieve the smallest possible ratio of the perimeter of each block to its area, if we consider a class of blocks that completely fill the frame area. Whereby, the statistical boundary error of compressed video decreases with reducing of the quantization blocks total perimeter.

The second mathematical criterion consists in reducing the number of adjacent cells. Compared with the number of adjacent cells bordering a cell in the prior art arrangement of rectangular quantization blocks, where each cell has eight adjacent cells, the present invention utilizes beehive-cell shaped and arranged blocks, each having six adjacent neighbors.

The third mathematical criterion is Chebyshev's criterion for optimal approximations of the desired function by the polynomial function of order N. This criterion follows from Chebyshev's theorem on alternance, i.e. that the approximation polynomial function of given order N (in our case, N is a number of quantization blocks) having the least deviation from the desired function, has equal deviations between the N junctions, where the approximation polynomial function coincides with the desired function.

Moreover, the application of the aforementioned second mathematical criterion of statistical error minimization provides a heretofore unknown optimal arrangement of conventional rectangular quantization blocks. This optimal arrangement, i.e. "brick-wall" arrangement, comprises the shifting of even horizontal/vertical lines to odd horizontal/vertical lines of blocks, respectively. Application of the aforementioned Chebyshev's criterion leads to a symmetrical variant of the "brick-wall" arrangement.

The present invention may also be applied where individual cells are overlapping when arranged in a block. The method of the present invention comprising applying the three mathematical optimization criteria may also be applied when it is tolerable to arrange shaped quantization blocks such that the quantization blocks are overlapping. In this case, the preferable arrangement is the beehive cell arrangement and preferable shape of quantization blocks is circle, surrounding the beehive cell hexagons.

BRIEF DESCRIPTION OF THE DRAWINGS

For a better understanding of the invention with regard to the embodiments thereof, reference is made to the accompanying drawings, in which like numerals designate corresponding elements or sections throughout, and in which.

DETAILED DESCRIPTION OF PREFERRED EMBODIMENTS

1. Prior Art Rectangular Blocks.

Figure 1:
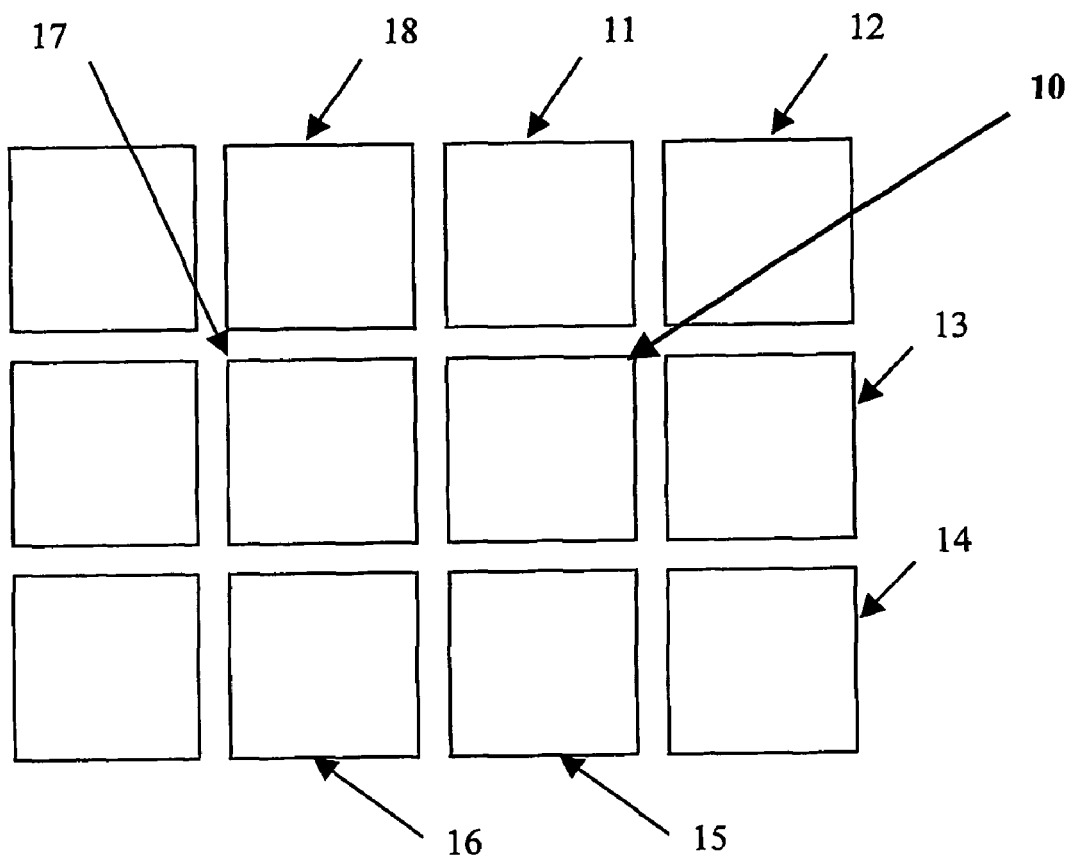
FIG. 1 is a schematic illustration of a prior art arrangement of rectangular quantization blocks.

Prior art quantization blocks, which are used in MPEG-X algorithms, have form of rectangles, arranged by the way, as it is shown in FIG. 1. In this case each rectangular block 10 has eight neighbors: North 11, North-West 12, West 13, South-West 14, South 15, South-East 16, East 17 and North-East 18. If the quantization blocks and macro-blocks, i.e. group of the quantization blocks, defined for some frame, are transferred by a transferring vector in order to approximate the video information of the next frame, a statistical error of the next picture imagination is defined by the block neighbors, having independent color and brightness quantization rule, wherein the error arises on the block boundaries.

2. Beehive Cell Arrangement of Shaped Blocks.

Figure 2:
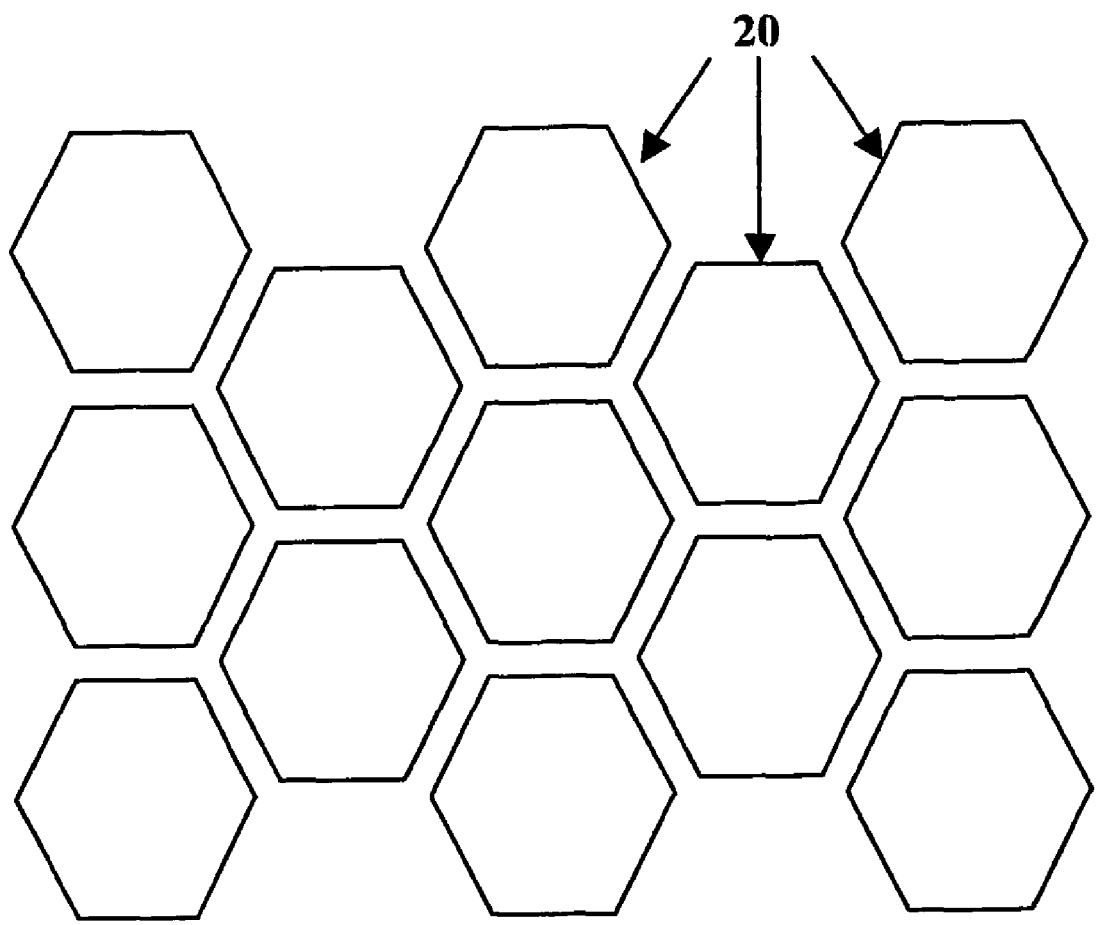
FIG. 2 is a schematic illustration of an embodiment of the present invention, showing the optimal grouping of pixels into blocks shaped and arranged similarly to beehive cells.

The beehive cell 20 type of quantization, i.e. grouping the pixels into blocks 20 having the shape and arrangement of beehive cells, shown in FIG. 2, one preferred embodiment of the present invention, has several benefits in comparison to prior art grouping the pixels into rectangular quantization blocks 10, 11, 12, etc., arranged as it is shown in FIG. 1. These benefits include:

Improved Quality of Static Compressed Picture Imaging

Static compressed picture imaging is improved by about 7.5%. The static desired picture, approximated by the compressed quantization blocks, has an approximation error that directly depends on the ratio of the block's perimeter to area. Comparison of perimeters of the cells having equal areas, prior art rectangular cell 10 and beehive cell 20 represented in this invention, gives the following characteristic ratio $P_4/P_6$, that is equal to:

$$\frac{P_4}{P_6} = \frac{2\sqrt{3\sqrt{3}}}{3\sqrt{2}} \approx 1.0746$$

where $P_4$ is the perimeter of rectangle, having area $S_4=(P_4/4)^2$ $P_6$ is the perimeter of the bee cell, having area $S_6=S_4$.

Reduction of Quality Loss in Motion Vector Processes for Transferring Quantization Block Video Information from One Frame to a Successive Frame A reduction of quality loss on the order of about 33% is achieved by the present invention. This effect is explained by the specific beehive-cells arrangement of hexagonal quantization blocks. When a block, defined for some frame, is transferred by a transferring vector in order to approximate the video information of the next frame, the value of statistical error in the next compressed picture image directly depends on the number of compressed neighbor blocks contiguous to the compressed block. In contrast to the prior art use of blocks 10, 11, 12, etc., having rectangular-shaped cells arranged in a way that results in each block having eight contiguous neighbors: North, North-West, West, South-West, South, South-East, East and North-East, the use of hexagonal blocks 20 shaped and arranged in the form of the beehive cells according to the present invention, leads to each block having six contiguous neighbors and therefore having a lower value of statistical error in successive images.

Optimal Quantization According to Chebyshev's Criterion of the Desired Function Approximation by Polynomial Function Chebyshev's theorem on alternance says that the approximation polynomial function of given order N, having the minimal deviation from the desired function, has equal deviations between the N junctions, where the approximation polynomial function coincides with the desired function. In the present invention, the desired function is the initial full (i.e. uncompressed) video information; the approximation polynomial function is the frame built from quantization blocks having compressed video information; and the given order N is the number of the quantization blocks. So the present invention's use of blocks 20 shaped and arranged in a beehive cell-formation leads to six equivalent neighbors, thereby providing equivalent statistical errors, i.e. equal deviations of the approximation polynomial function due to symmetrical statistical influence of the neighbors, in contrast to the prior art use of blocks 10, 11, 12, etc., which causes different statistical errors, i.e. different deviations of the approximation polynomial function.

The effect of applying the three mathematical criteria together results in movie compression that is significantly better than when using the known grouping of pixels into rectangular quantization blocks.

Figure 4:
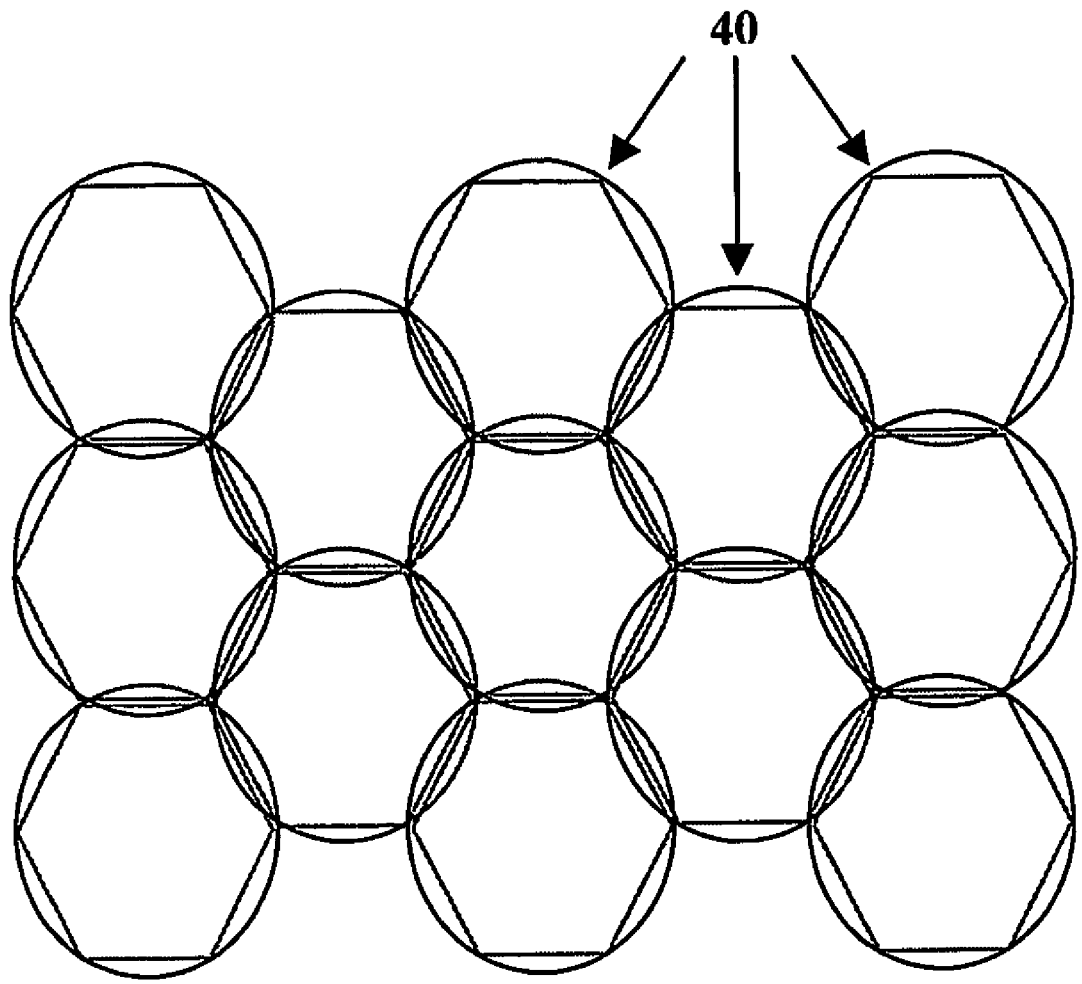
FIG. 4 is a schematic illustration of an embodiment of the present invention, showing a beehive arrangement of overlapping circle-shaped quantization blocks.

With reference to FIG. 4, optimizing by arranging and shaping overlapping quantization blocks using the mathematical criteria of the present invention leads to a beehive cells arrangement of circle-shaped overlapping quantization blocks 40. Circle-shaped blocks surround the beehive cell hexagons. A slight variation of this embodiment includes where the circle shape is approximated by a polygon covering the beehive cell (not shown).

3. Brick-Wall Arrangement of Rectangular Blocks.

Figure 3:
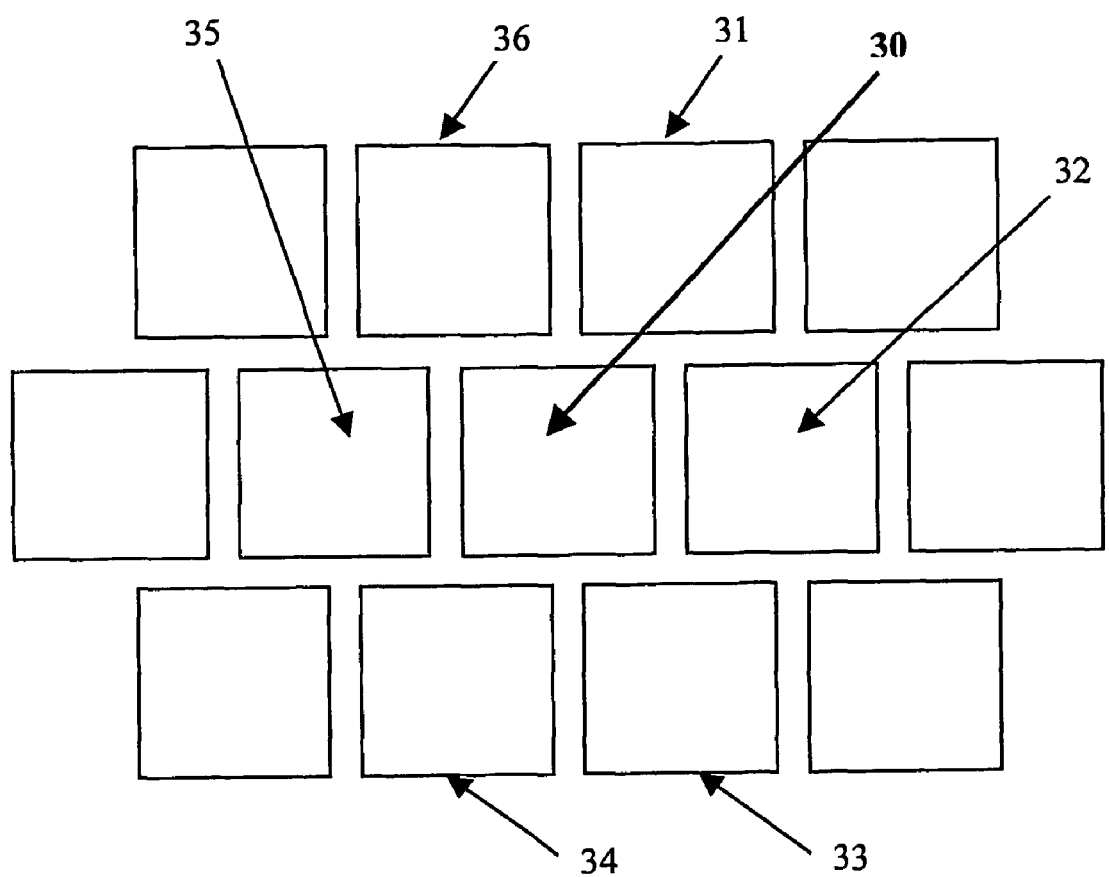
FIG. 3 is a schematic illustration of an embodiment of the present invention, showing the brick-wall arrangement of rectangular quantization blocks.

Referring now to FIG. 3, it is shown that the use of the "brick-wall" arrangement of rectangular quantization blocks, as an alternative embodiment of present invention, leads to six neighbors 31, 32, 33, 34, 35 and 36 of the arbitrary chosen quantization block 30, in contrast to the prior art arrangement shown in FIG. 1. This fact also provides significantly reduced quality loss in the process of a vector transferring the video information of quantization blocks from the previous frame to the next. This effect is explained by the fact that if blocks, defined for some frame, are transferred by a transferring vector in order to approximate the video information of the next frame, a statistical error of the next picture image directly depends on number of the nearest neighbor blocks. Taking into consideration Chebyshev's theorem on alternance, the symmetrical variant of the brick-wall arrangement, as it is shown in FIG. 3, is optimal. Moreover, with respect to the theorem, the prior art arrangement of rectangular quantization blocks, as it shown in FIG. 1., is extremely non-optimal.

It should be appreciated that the above-described embodiments are merely exemplary in nature. It is anticipated that one of ordinary skill in the art will be able to make many alterations and modifications to the exemplary embodiments without departing from the spirit of the invention, the true scope of which should only be determined by reference to the claims which follow in conjunction with the broadest interpretation of the teachings of the specification.

I claim:

1. A computer program product comprising a computer usable medium having computer readable code embodied therein for execution on a general purpose computer, said computer program product operating in a video compression-decompression system, said system applying MPEG-X series standards basic principle comprising a digital approximation of analog video information in frames, said frames comprising pixels arranged and shaped to fill the area of the frames completely, wherein the frames are partitioned into non-overlapping quantization blocks of grouped complete and incomplete pixels, and wherein the quantization blocks are encoded by a transform providing intra-block encoding-correlation among the complete and incomplete pixels, said computer usable medium storing instructions that, when executed by the computer, cause the computer to perform a method for optimally arranging and shaping said quantization blocks of pixels into groupings, said method comprising:

determining that arrangement for which the statistical boundary error as equalized in accordance with Chebyshev's alternance theorem, whereby:
a) all of said quantization blocks have the same shape, independent of congruence and alignment with the shape of each of said pixels;
b) each of said quantization blocks has the same environment as contiguous quantization blocks;
c) each of said quantization blocks has the lowest possible number of contiguous quantization blocks;
d) the variance of measured distances from the center of one of said quantization blocks to the centers of neighboring quantization blocks is minimized; and
e) the variance of measured common boundary lengths between one of said quantization blocks and contiguous quantization blocks is minimized.

2. The optimization method according to claim 1, wherein application of Chebyshev's alternance theorem to qnantization blocks initially having a rectangular shape provides that said quantization blocks are arranged in a brick wall arrangement, whereby each of said quantization blocks has only six contiguous quantization blocks.

3. The optimization method according to claim 1, wherein application of Chebyshev's alternance theorem produces quantization blocks having a hexagonal shape and being arranged in a beehive-cell arrangement, whereby each of said quantization block has only six contiguous quanitization blocks.

4. A computer program product comprising a computer usable medium having computer readable code embodied therein for execution on a general purpose computer, said computer program product operating in a video compression-decompression system, said system applying MPEG-X series standards basic principle comprising digital approximation of analog video information in frames, said frames comprising pixels arranged and shaped to fill the area of the frames completely, wherein the frames are partitioned into overlapping quantization blocks of grouped complete and incomplete pixels, and wherein the quantization blocks are encoded by a transform providing intra-block encoding-correlation among the complete and incomplete pixels, and wherein at least one said pixel belongs to more than one quantization block, said computer usable medium storing instructions that, when executed by the computer, cause the computer to perform a method for optimally arranging and shaping said overlapping quantization blocks of pixels into groupings, comprising determining that arrangement for which the statistical boundary error is equalized in accordance with Chebyshev's alternance theorem, whereby:

a) said overlapping quantization blocks have the same shape, independent of congruence and alignment with the shape of each of said pixels;
b) each overlapping quantization block has the same environment as contiguous overlapping quantization blocks;
c) each said overlapping quantization block has the least possible number of said contiguous overlapping quantization blocks;
d) variance of measured distances from the center of one of said overlapping quantization blocks to the centers of neighboring overlapping quantization blocks is minimized; and
e) variance of measured overlapping areas between one of said overlapping quantization blocks and contiguous overlapping quantization blocks is minimized.

5. The optimization method according to claim 4, where said overlapping quantization blocks have a circular shape and are overlapped in an arrangement similar to beehive cells, wherein said circle shape surrounds said beehive cell, and wherein each of said overlapping circular quantization block has common pixels only with six neighbor overlappinq circular quantization blocks.

6. The optimization method according to claim 5, where said circular shape comprises a polygonal circular approximation surrounding said beehive cell.

7. A computer program product comprising a computer usable medium having computer readable code embodied therein for execution on a general purpose computer, said computer program product operating in a video compression-decompression system, said system applying MPEG-X series standards basic principle comprising a digital approximation of analog video information in frames, said frames comprising pixels arranged and shaped to fill the area of the frames completely, wherein the frames are partitioned into quantization blocks of grouped complete and incomplete pixels, and wherein the quantization blocks are encoded by a transform providing intra-block encoding-correlation among the complete and incomplete pixels, said computer usable medium storing instructions that, when executed by a computer, cause the computer to perform a method for organization of said quantization blocks into such arrangements that at least two said video-information frames differ by said arrangements of said quantization blocks;

and wherein the statistical boundary error for each said arrangement is equalized in accordance with Chebyshev's alternance theorem, whereby
a) all of said quantization blocks have the same shape, independent of congruence and alignment with said pixel's shape;
b) each quantization block has the same environment as contiguous quantization blocks;

c) each of said quantization blocks has the lowest possible number of contiguous quantization blocks;
d) variance of measured distances from the center of one of said quantization blocks to the centers of neighboring quantization blocks is minimized; and
e) variance of measured common boundary lengths between one of said quantization blocks and contiguous quantization blocks is minimized.

8. The method for organization of quantization blocks according to claim 7,
wherein video-information frames have said organization of equivalent rectangular quantization blocks into a brick-wall arrangement having horizontal respective shifts of odd and even quantization blocks rows,
and wherein at least two said arrangements, associated with at least two said frames correspondingly, differ by said horizontal respective shifts of said quantization blocks rows.

9. The method for organization of quantization blocks according to claim 7, wherein video-information frames have said organization of equivalent rectangnlar quantization blocks into a brickwall arrangement having vertical respective shifts of odd and even quantization blocks columns, and wherein at least two said arrangements, associated with at least two said frames correspondingly, differ by said vertical shifts of said quantization blocks columns.

10. The method for organization of quantization blocks according to claim 7, wherein video-information frames have said organization of equivalent rectangular quantization blocks into a brick-wall arrangement, and wherein at least one said frame has said brick-wall arrangement with horizontal respective shifts of quantization blocks rows, and at least one said frame has said brick-wall arrangement with vertical respective shifts of quantization blocks columns.

11. The method for organization of quantization blocks according to claim 7, wherein video-information frames have said organization of equivalent shaped quantization blocks into a beehive cells arrangement, and wherein said beehive cells have vertexes oriented horizontally, whereby forming odd and even shaped quantization blocks columns, which are respectively shifted on vertical, and wherein at least two said arrangements, associated with at least two said frames correspondingly, differ by the respective vertical shifts of said odd and even columns of said shaped quantization blocks.

12. The method for organization of quantization blocks according to claim 7, wherein video-information frames have said organization of equivalent shaped quantization blocks into a beehive cells arrangement, and wherein said beehive cells have vertexes oriented vertically, thereby forming odd and even shaped quantization blocks rows, which are respectively shifted on horizontal, and wherein at least two said arrangements, associated with at least two said frames correspondingly, differ by the respective horizontal shifts of said odd and even rows of said shaped quantization blocks.

13. The method for organization of quantization blocks according to claim 7, wherein video-information frames have said organization of equivalent shaped quantization blocks into a beehive cell arrangement, and wherein at least one said beehive cell arrangement, associated with at least one frame, comprises said beehive cells having vertexes oriented horizontally, whereby forming odd and even shaped quantization blocks columns, which are respectively shifted on vertical, and at least one said beehive cell arrangement, associated with at least one said frame, comprises said beehive cells having vertexes oriented vertically, whereby forming odd and even shaped quantization blocks rows, which are respectively shifted on horizontal.

14. The method for organization of quantization blocks according to claim 7, wherein said pixels have rectangular shape and are arranged along straight rows and columns.

15. The method for organization of quantization blocks according to claim 7, wherein said pixels have triangular shape.

16. The method for organization of quantization blocks according to claim 7, wherein said pixels have hexagonal shape and are arranged similar to beehive cells arrangement.

* * * * *